United States Patent
Jeng et al.

(10) Patent No.: US 8,949,104 B2
(45) Date of Patent: Feb. 3, 2015

(54) MONITORING ENTERPRISE PERFORMANCE

(75) Inventors: Jun-Jang Jeng, Armonk, NY (US); Rong Liu, Sterling, VA (US); Anil Nigam, Stamford, CT (US); Chian-Rou Shieh, Hsinchu (TW); Roman Vaculin, Schenectady, NY (US); Frederick Wu, Cos Cob, CT (US); Zhe Shan, State College, PA (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 13/111,168

(22) Filed: May 19, 2011

(65) Prior Publication Data

US 2012/0296624 A1    Nov. 22, 2012

(51) Int. Cl.
*G06F 9/45* (2006.01)
*G06F 11/34* (2006.01)

(52) U.S. Cl.
CPC ........ *G06F 11/3447* (2013.01); *G06F 11/3457* (2013.01)
USPC .......................................................... 703/22

(58) Field of Classification Search
CPC ............ G06F 17/5022; G06F 11/3447; G06F 11/3457; G06F 17/5009; G06F 11/3664
USPC .......................................................... 703/22
See application file for complete search history.

(56) References Cited

U.S. PATENT DOCUMENTS

| | | | |
|---|---|---|---|
| 7,162,427 B1 * | 1/2007 | Myrick et al. | 705/348 |
| 7,222,302 B2 | 5/2007 | Hauser et al. | |
| 7,313,533 B2 | 12/2007 | Chang et al. | |
| 7,404,185 B2 | 7/2008 | Zhang et al. | |
| 7,475,080 B2 | 1/2009 | Chowdbary et al. | |
| 7,739,136 B2 | 6/2010 | Chang et al. | |
| 7,756,751 B2 | 7/2010 | Cheng et al. | |
| 7,779,104 B2 | 8/2010 | Lee et al. | |
| 2003/0172247 A1 * | 9/2003 | Bayer et al. | 712/12 |
| 2003/0187743 A1 | 10/2003 | Kumaran et al. | |
| 2005/0080640 A1 | 4/2005 | Bhaskaran et al. | |
| 2005/0171810 A1 | 8/2005 | Klein et al. | |

(Continued)

OTHER PUBLICATIONS

Costello et al. Building a Process Performance Model for Business Activity Monitoring, in Wojtkowski, W., Wojtkowski, G., Lang, M., Conboy, K., Barry, C., eds.: Information Systems Development, Springer US (2009) 237-248.

(Continued)

*Primary Examiner* — Saif Alhija
(74) *Attorney, Agent, or Firm* — Ryan, Mason & Lewis, LLP

(57) ABSTRACT

The techniques provided herein include obtaining a model of an enterprise operation that specifies initiation and one or more evolution milestones of one or more business entities, formulating one or more performance metrics for the enterprise operation, wherein the one or more performance metrics are calculated from the one or more business entities, the one or more evolution milestones, and one or more relevant external events, and using the one or more business entities and one or more performance metrics to automatically create an executable performance monitoring model for the enterprise operation, wherein the executable performance monitoring model processes data in the one or more business entities, the one or more evolution milestones, and the one or more relevant external events to compute the one or more performance metrics for the enterprise operation.

19 Claims, 9 Drawing Sheets

(56) References Cited

U.S. PATENT DOCUMENTS

| | | |
|---|---|---|
| 2006/0106626 A1 | 5/2006 | Jeng et al. |
| 2006/0111921 A1 | 5/2006 | Chang et al. |
| 2006/0155562 A1 | 7/2006 | Kano et al. |
| 2006/0212567 A1 | 9/2006 | Gulledge et al. |
| 2007/0039049 A1 | 2/2007 | Kupferman et al. |
| 2008/0163164 A1 | 7/2008 | Chowdhary et al. |
| 2008/0189534 A1 | 8/2008 | Jeng et al. |
| 2008/0209029 A1 | 8/2008 | Bhattacharya et al. |
| 2009/0138294 A1 | 5/2009 | Kumaran et al. |
| 2011/0131080 A1 | 6/2011 | Chao et al. |
| 2012/0011079 A1 | 1/2012 | Kumaran et al. |

OTHER PUBLICATIONS

Wikipedia, Business Activity Monitoring, Mar. 29, 2011, http://en.wikipedia.org/w/index.php? title=Business_activity_monitoring&oldid=421297423.

Chao et al. Artifact-based Transformation on IBM Global Financing, 7th International Conference on Business Process Management, vols. 5701 of Lecture Notes in Computer Science, Springer (2009) 261-277.

Cohn et al. Siena: From Powerpoint to Web App in 5 Minutes, in Bouguettaya, A., Krueger, I., Margarita, T., eds.: 6th International Conference on Service-Oriented Computing (ICSOC'08), Lecture Notes in Computer Science, Springer Berlin / Heidelberg (2008) 722-723.

Folan et al. A Review of Performance Measurement: Towards Performance Management, Computers in Industry 56 (2005) 663-680.

Wikipedia, Organizational Theory, Aug. 24, 2004, http://en.wikipedia.org/w/index.php? title=Organizational_theory&direction=prev&oldid=16295836.

Kumaran et al. A Doc-Oriented Programming, in Symposium on Applications and the Internet (SAINT), pp. 334-343, 2003.

Luckham, The Power of Events: An Introduction to Complex Event Processing in Distributed Enterprise Systems, Boston: Addison-Wesley, 2002.

Zisman, IBM's Vision of the ON Demand Enterprise, in IBM Almaden Conference on Co-Evolution of Business and Technology, 2003.

White, Now is the Right Time for Real-Time Bi, Information Management Magazine, 2004.

Jeng et al. Policy Driven Business Performance Management, in Sahai, A. Wu, F. eds.: 15th IFID/IEEE International Workshop on Distributed Systems: Operations and Management (DSOM '04). vol. 3278 of Lecture Notes in Computer Science, Springer Berlin, Heidelberg (2004) 52-63.

Redmond et al., A Semantic Approach to Monitor Business Process, Commun, ACM 48 (2005) 55-59.

Lakshmanan et al., A Business Centric End-to-End Monitoring Approach for Service Composites, in 2010 IEEE International Conference on Services Computing (SCC'10) IEEE Computer Society (2010) 409-416.

Corea et al. Challenges in Business Performance Measurement, The Case of a Corporate It Function, In: 5th International Conference on Business Process Management (BPM'07) vol. 4714 of Lecture Notes in Computer Science, Springer Belin / Heidelberg (2007) 16-31.

Nesamoney, BAM: Event-Driven Business Intelligence for the Real-Time Enterprise, Information Management Magazine 14 (2004) 38-48.

White, IBM Cooperation (May 2004).

Nigam et al., Business Artifacts: An Approach to Operational Specification, IBM Systems Journal 42 (2003) 428-445.

Bhattacharya et al., Artifact-Centered Operational Modeling: Lessons from Customer Engagements, IBM Systems Journal 46 (2007) 703-721.

IBM Websphere Business Modeler, http://www-01.ibm.com/software/integration/wbimodeler, downloaded Mar. 27, 2012.

IBM: Common Event Infrastructure, 2004.

White, Best Practices for Using Websphere Business Modeler and Monitor, Technical Report, IBM 2006.

Neely et al., Designing Performance Measures: a Structured Approach, International Journal of Operations & Production Management 17, (1997) 1131-1152.

Cognos Business Intelligence and Financial Performance Management, http://www-01.ibm.com/software/data/cognos/ (2008).

IBM Websphere Process Server, http://www-01.ibm.com/software/integration/wps downloaded Mar. 27, 2012.

IBM Websphere Business Monitor, http://www-01.ibm.com/software/integration/wbimonitor/ downloaded Mar. 27, 2012.

Amit et al., Strategic Assets and Organizational Rent, Strategic Management Journal; 14, (1), pp. 33-46 (1993).

Kaplan et al., Managing Alliance with the Balance Scorecard, Harvard Business Review, pp. 114-120, Jan.-Feb. 2010.

Jeng et al. Service-Oriented Business Performance Management for Real-Time Enterprise, The 8th IEEE International Conference on E-Commerce Technology and The 3rd IEEE International Conference on Enterprise Computing, E-Commerce, and E-Services (CEC/EEE'06), pp. 28, 2006.

McDavid, A Standard for Business Architecture Description, IBM Systems Journal, 38(1):12-31, 1999.

Object Management Group, UML Profile for Schedulability, Performance and Time Specification, Mar. 2002.

Selic, Generic Framework for Modeling Resources with UML, Computer 33(6):64-69, 2000.

Taticchi et al., A Decomposition and Hierarchical Approach for Business Performance Measurement and Management, Measuring Business Excellence 13(4):47-57, 2009.

\* cited by examiner

US 8,949,104 B2

MONITORING ENTERPRISE PERFORMANCE

FIELD OF THE INVENTION

Embodiments of the invention generally relate to information technology, and, more particularly, to performance management.

BACKGROUND OF THE INVENTION

Performance management has emerged as a critical practice for enterprises to help assess progress of enterprise activities towards achieving goals. Although various approaches for performance management have been proposed, the existing approaches face challenges. For example, challenges exist in identifying useful performance measures to capture progress towards goal attainment. Additionally, performance management requires input events or data collected from enterprise activities. Business processes are the main providers of these inputs. However, business/enterprise processes are often modeled with a focus on enterprise activities and their execution sequences using workflow technologies, without fully capturing the activity information context. As a result, business process applications may not be able to directly provide sufficient information for performance monitoring.

Further, existing approaches include a lack of systematic mechanisms for collecting data accurately and in a timely manner, and often, performance management solution is a manual process.

SUMMARY OF THE INVENTION

Principles and embodiments of the invention provide techniques for monitoring enterprise performance. An exemplary method (which may be computer-implemented) for monitoring enterprise performance, according to one aspect of the invention, can include steps of obtaining a model of an enterprise operation that specifies initiation and one or more evolution milestones of one or more business entities, formulating one or more performance metrics for the enterprise operation, wherein the one or more performance metrics are calculated from the one or more business entities, the one or more evolution milestones, and one or more relevant external events, and using the one or more business entities and one or more performance metrics to automatically create an executable performance monitoring model for the enterprise operation, wherein the executable performance monitoring model processes data in the one or more business entities, the one or more evolution milestones, and the one or more relevant external events to compute the one or more performance metrics for the enterprise operation.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
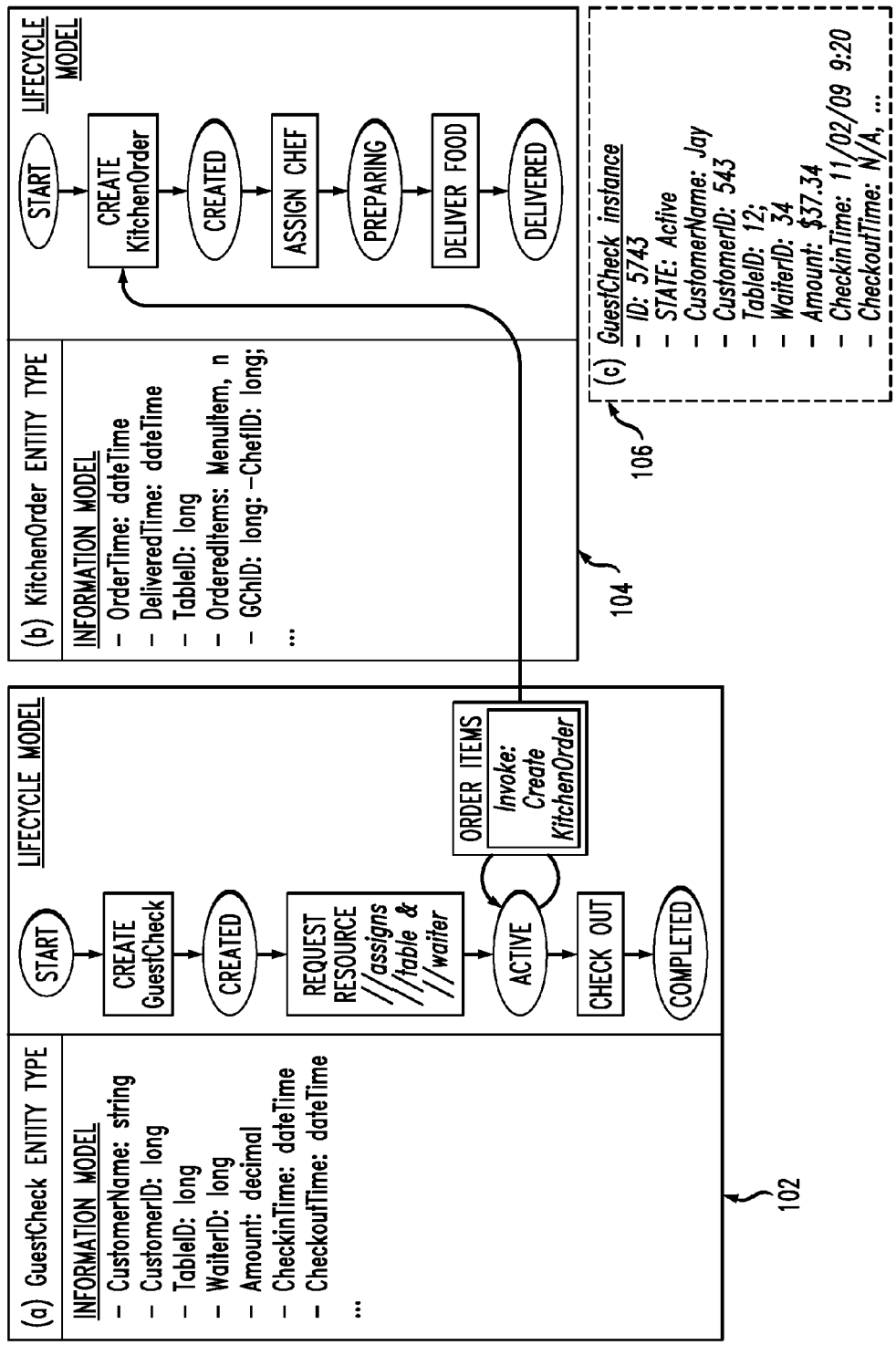
FIG. 1 is a diagram illustrating a restaurant example process model represented as business entity types with lifecycles, according to an embodiment of the present invention.

Principles of the invention include generating a performance monitor model from business entities. One or more embodiments of the invention include semi-automatically deriving real-time performance monitor solutions based on business entities to achieve multifaceted process visibility. As noted herein, existing approaches to performance monitoring are event-driven, wherein events from multiple sources are collected and analyzed based on pre-defined event rules or patterns. The techniques detailed herein, in contrast, include dynamically integrating events with contextual information to enable meaningful event analysis.

By way of example, banks may need to closely monitor transactions that occur within a time window to detect potential fraud. Each transaction triggers an event. However, every transaction occurs in the context of a customer account. Accordingly, the account provides the monitoring context that enables the correlation of these events. As event arrival is unpredictable, the context needs to be discovered dynamically and structured automatically.

Business entities provide a base for monitoring contexts. In one or more embodiments of the invention, enterprise/business users can directly specify monitoring requirements as key performance indicators (KPIs) and map KPIs to data attributes in business entities. Events are intuitively mapped to business entity states or activities that evolve a business entity lifecycle. Additionally, monitoring contexts and their correlation with events can be automatically derived from these business entities, and deployed as performance monitoring solutions, significantly reducing the complexity of performance monitoring.

As such, one or more embodiments of the invention include providing an intuitive mapping between business entities and monitoring contexts as well as an algorithm to derive monitoring contexts based on target KPIs and business entity-centric process models. Accordingly, in contrast to existing approaches, the techniques described herein include performance monitoring design that can be integrated with process modeling, a natural construct to hold event processing functions, and mitigating the gap between performance monitoring requirements and results of performance monitoring as a result of the model-driven approach.

In one or more embodiments of the invention, a monitoring model can rely on the business entity-centric (BEC) process modeling paradigm (also known as artifact-centric approach). A feature of the BEC approach is that it models both the information (data) and the processes in one unified framework. One focus is on identifying and defining the key conceptual business entities (BE) (for example, a purchase order in an ordering system) of a particular enterprise process with the enterprise process being modeled by way of interactions of these key business entities.

One or more embodiments of the invention use business entities themselves as a fundamental element for definition of monitoring contexts. Because metrics and KPIs can be expressed in the vocabulary familiar to enterprise users, this approach allows substantial parts of monitoring models to be defined or modified by domain experts and by enterprise users. These aspects increase agility of monitoring systems because for definition of monitoring contexts that take new situations under consideration, less technical skills are required.

The business entity-centric approach considers data as an essential part of enterprise processes, and as such it defines the enterprise processes in terms of interacting key business entities. Each business (enterprise) entity (BE) can be characterized by an information model (data) and a lifecycle model (the possible evolutions over time; that is, activities/tasks acting on the information model). It can also be useful, for example, to distinguish the notion of BE types and BE instances. Intuitively, a BE instance of a particular type can be seen as an instantiated complex data entity (for example, similar to the notion of a data record) which is identified by a unique identifier, and which can evolve over time; that is, some values of its attributes can be modified (except for the identifier, which is immutable). The particular evolutions of the entity instance over time are governed by the life-cycle of the BE.

Formally, an business entity type e is a tuple e=<$name_e$, $id_e$:$E_{Ref}$ $ds_e$, $l_e$>, where $name_e$ is the name of type e, $id_e \in E_{Ref}$ is an attribute serving as an identifier of instances of e, with $E_{Ref}$ being a set of all possible identifiers of instances of e, $ds_e$ is the information model (data schema) of e, and $l_e$ is the lifecycle of e.

As detailed herein, one or more embodiments of the invention use a variant of the nested relation model as an information model, and a variant of state machines as the lifecycle model.

A data schema ds is a set of named and typed attributes, that is, ds={<$name_i$:$type_i$, $card_i$>i=1, ..., k}, where for the i-th attribute $name_i$ is its name, $type_i \in T$ is its type, and $card_i \in \{1, n\}$ specifies its cardinality. The set T is a union of simple types (int, float, etc.), complex types (records), and references to entity types.

By way of illustration, consider the following restaurant example. The example models a visit of a guest in a restaurant. During analysis, several key business entity types have been identified (only a selection of which is presented).

FIG. 1 is a diagram illustrating a restaurant example process model represented as business entity types with lifecycles, according to an embodiment of the present invention. By way of illustration, FIG. 1 depicts information models of some entity types and a sample entity instance. A GuestCheck (GC) entity type 102 represents the basic information about the customer visit. A KitchenOrder (KO) entity type 104 contains details of the items the customer has ordered along with any special preferences. Note that one GC instance (such as, for example, item 106) can lead to creation of several KO instances; that is, several orders are placed to a kitchen to prepare meals during one guest's visit. As described herein, the overall sales process can be described by capturing the lifecycle of the introduced main business entities.

The lifecycle of a business entity can be represented as a finite state machine. Accordingly, the notion of tasks, represented as a Tasks set, can be distinguished from activities, represented as an Activities set. A task represents a logical unit of work, and a task may be a human task, an invocation of a service, or an assignment task to/from attributes of the information model. An activity is a named access point that can be invoked to perform some work, and that may specify its operations as flows of tasks (represented as a directed graph).

A finite state machine-(FSM)-based lifecycle is a tuple $l$=<S, TR, $s_{init}$, $s_{final}$> where S is a set of named states, with $s_{init} \in S$ and $s_{final} \in S$ being dedicated states representing the initial and the final state of the lifecycle respectively, and TR is a set of oriented transitions, with t∈TR being a tuple:

$$t=\langle s_t^{source}, s_t^{target}, activity_t, condition_t \rangle, s_t^{source} \in S, s_t^{target} \in S, activity_t \in Activities.$$

Intuitively, transition t moves the business entity instance from state $s_t^{source}$ to state $s_t^{target}$. Transition t is initiated if and only if its associated $activity_t$ is activated (invoked) and $condition_t$ holds.

FIG. 1 depicts a fragment of the restaurant process model with lifecycles of the GuestCheck (GC) and the KitchenOrder (KO) entity types. States are showed as ovals, activities as rectangles, transitions are associated with triggering activities, and invocations are represented as dashed lines. When a customer arrives, the greeter creates a new instance of the GC entity by using CreateGuestCheck activity and records the table number and responsible waiter to the GC (activity RequestResource). After the customer has made selections, the waiter records them in the GC, and places an order to the kitchen (OrderItems activity creates a new KO entity instance by invoking the CreateKitchenOrder activity of KO). The lifecycle of KO continues with assigning the chef to the order and delivering the food. The customer can place more orders, which will lead to the creation of new KO instances. Eventually, when the customer requests the check, the GC is totaled, and paid (the CheckOut activity of the GC).

As detailed herein, a general performance monitoring architecture can include an event absorption layer to collect events and relevant data, an event processing and filtering layer to analyze events using event rules or event patterns, to calculate metrics and to generate outgoing events, and an event delivery and display layer to dispatch outgoing events or represent metrics in a dashboard. In one or more embodiments of the invention, a conceptual and technical mechanism for events processing and analysis includes a monitoring context, which serves the purpose of explicit modeling of the contextual information required for event analysis.

An event type v is a tuple $v=<ds_{header}, ds_{payload}>$, where $ds_{header}$ is a data schema of an event header, and $ds_{payload}$ is a data schema of an event payload. Additionally, V is used to denote the set of all possible events.

Event occurrences (or instances, or simply events) must conform to some event type (schema). The event header can carry auxiliary, domain independent information (such as identifier of an event, timestamp, event type name, etc.), while the event payload is intended to carry domain/application specific information related to the particular event occurrence at a particular time and place in the application logic (for example, the name of a new restaurant customer).

A metric m is a tuple $m=<name_m, value_m:type_m, f_m>$ where $name_m$ is a metric name, $value_m$ is a value of the metric of type $type_m$ (a simple type), and $f_m$ is a function $f_m:t_i x \ldots x\ t_n \rightarrow type_m$ for computing value of m with $t_1, \ldots, t_n$ being simple types.

A metric is a domain specific function (calculation), designed by domain experts, that measures some relevant performance metric. Given a vector of simple values (data attributes, values of other metrics, values carried by events, etc.), a metric calculates one value. In one or more embodiments of the invention, metrics are defined in the scope of monitoring contexts, and monitoring context types and instances are distinguished. Intuitively, a monitoring context type defines a set of metrics and their computation details, and inbound/outbound events and rules for processing events that update metrics of the context.

A monitoring context type mc is a tuple $mc=<K, V_{in}, f_{filter}, f_{cr}, M, f_{op}, f_{trigger}, V_{out}, f_{out}>$, and a monitoring context instance is an instance of mc with a unique identifier, where:

K is a set of keys (key attributes) that together uniquely identify instances of mc;

$V_{in}$ is a set of inbound event types which are used to update metrics;

$f_{filter}:V_{in} \rightarrow$ {true, false} is an optional filtering function (condition) that determines whether particular events in $V_{in}$ should be accepted to impact mc;

$f_{cr}:V_{in} \rightarrow K$ is a correlation function that specifies which monitoring context instances of mc should process an accepted inbound event;

M is a set of metrics, ∀ m∈M its value m.value is computed (function $f_m$) from inbound events $V_{in}$ of mc and from the other metrics (of mc and possibly of other monitoring contexts);

$f_{op}: V_{in} \rightarrow$ {create, terminate, null} is a function controlling creation and termination of monitoring context instances; that is, if an inbound event is mapped to "create," a new instance of mc will be created, and if it is mapped to "terminate," the monitoring context instance correlated with this event will be terminated;

$f_{trigger}:M \rightarrow P(V_{in})$ is a triggering function that determines what inbound events can update a metric (here P denotes a power-set);

$V_{out}$ is a set of outbound event types which can be generated by mc to signal situations requiring enterprise attention;

$f_{out}: M \rightarrow V_{out}$ is a mapping that determines when and what outbound events should be raised given some metric conditions.

Notice that the metrics defined in the scope of a monitoring context are called instance-based metrics, meaning that their values are measured specifically for a monitoring context instance (an example of such a measure might be the total amount of a guest check, or the overall food cost of a kitchen order). Also, measures evaluated across multiple instances of a monitoring context type or across multiple types are often of interest. Such measures are defined as key performance indicators (KPIs) aggregated functions on metrics of (possibly multiple) monitoring context types.

A KPI is a tuple $kpi=<name_{kpi}, value_{kpi}:type_{kpi}, MC, f_{kpi}>$, where $name_{kpi}$ is a kpi name, $value_{kpi}$ is a value of the kpi of type $type_{kpi}$, MC is the set of monitoring context types across which the kpi is evaluated, and $f_{kpi}:MC \rightarrow type_{kpi}$ is an aggregation function for computing value of kpi operating on the metrics of monitoring contexts in MC.

A monitoring model includes a set of KPIs and monitoring contexts supporting calculations of the KPIs.

A monitoring model $mm=<KPI, MC>$, where KPI is a set of target KPIs, and MC is the set of monitoring context types used in target KPIs definitions.

Figure 2:
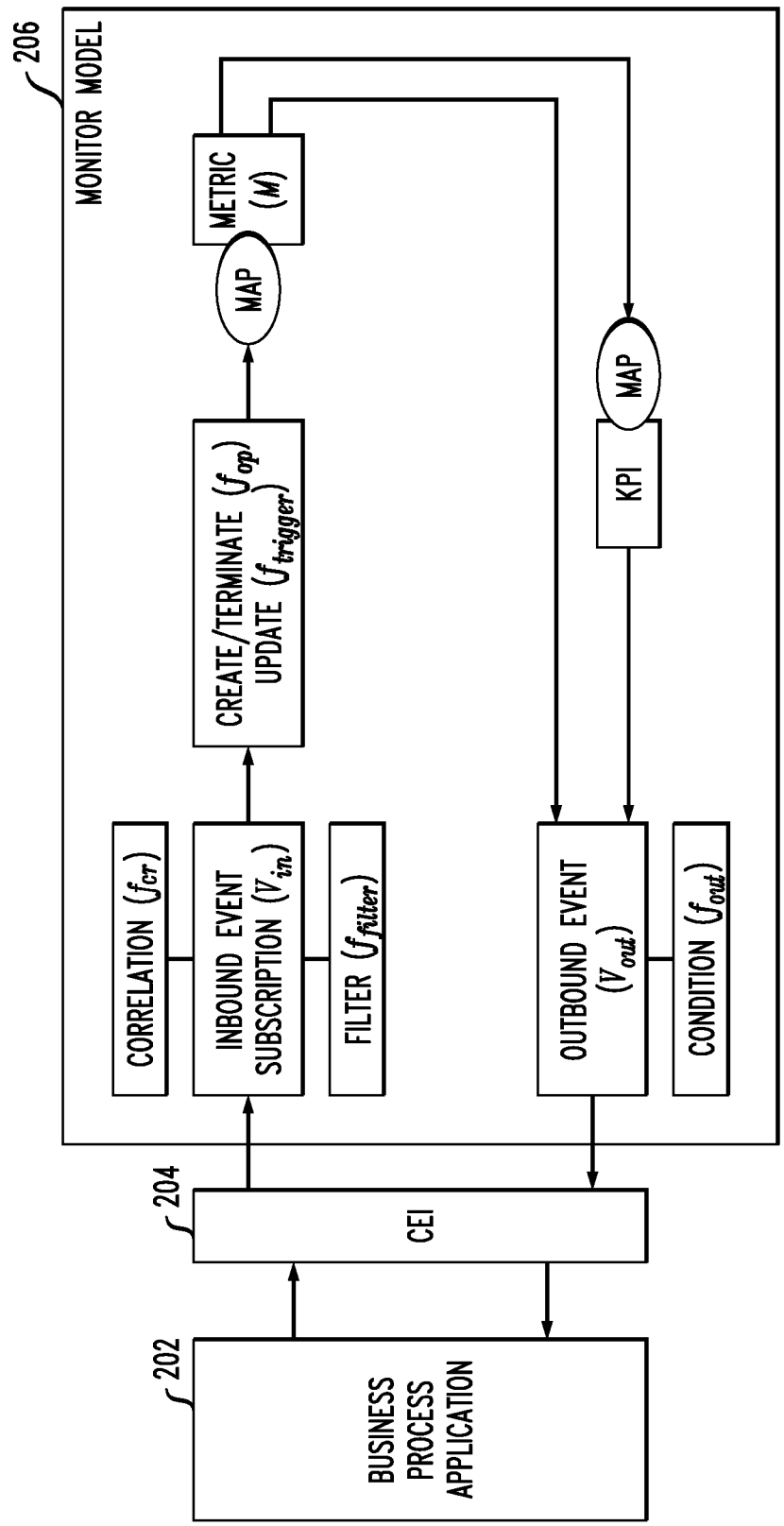
FIG. 2 is a diagram illustrating monitoring model architecture, according to an embodiment of the present invention.

FIG. 2 is a diagram illustrating monitoring model architecture, according to an embodiment of the present invention. By way of illustration, FIG. 2 depicts a business process application 202, common event infrastructure (CEI) 204, and a monitor model 206. Accordingly, FIG. 2 shows an architecture describing how the elements of a monitoring model work together to compute target KPIs. In this architecture, a monitoring model 206 subscribes to an event broker, CEI 204, to receive inbound events. By using the sets of inbound events $V_{in}$ of monitoring context types, a particular inbound event is first directed to the corresponding context types. Next, filtering function $f_{filter}$ decides if the event should be used to update a particular type. Also, the correlation $f_{cr}$ identifies the target monitoring context (instance) for an event, and possibly $f_{op}$ determines whether the event creates or terminates a monitoring context. Further, $f_{trigger}$ determines which metric will be refreshed by the event. If $f_{out}$ is satisfied, some outbound events $V_{out}$ are generated and sent to their destination through an event broker. Additionally, if some updated metric contributes to some KPI, the KPI is recalculated.

Business entities provide a natural base for defining monitoring contexts because a business entity itself can be seen as a monitoring context. A business entity manifests an operational goal (such as processing a customer order), and thus it is often an object that needs to be monitored. An information model of a BE represents the explicit knowledge about progress toward the goal. Therefore, (fragments of) the information model provide(s) basic metrics for the monitoring context (and for creating aggregate metrics). The BE lifecycle, and states in particular, represent important checkpoints that are of a concern at an enterprise level because states can be a progress indicator. KPIs (and complex metrics), which are typically derived from strategic goals, can be decomposed into operational goals. Thus, KPIs can be calculated as the aggregation on the information of business entities. Further, events can be derived from the BE lifecycle to capture key points of change in the lifecycle.

Figure 5:
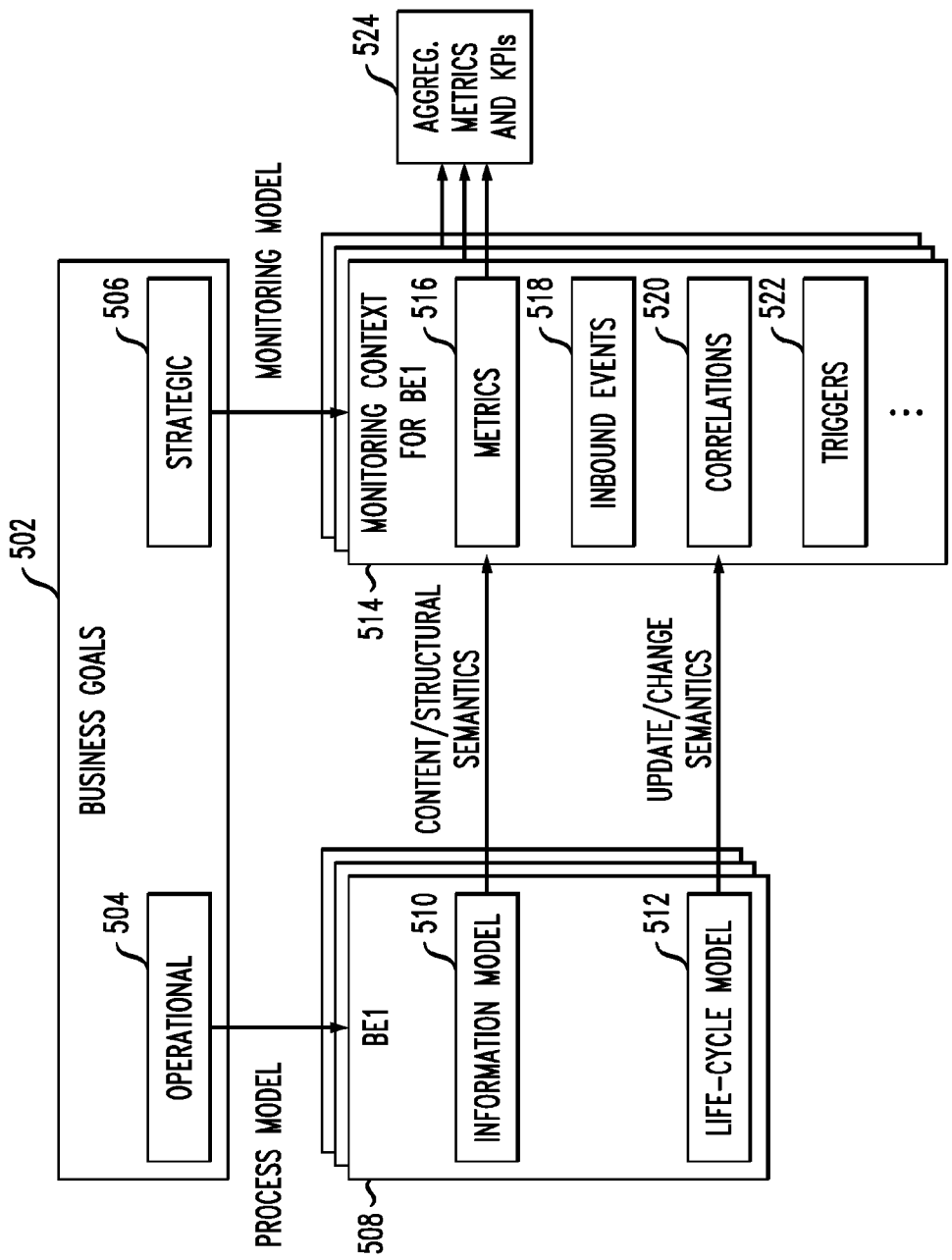
FIG. 5 is a diagram illustrating architecture for mapping business entities (BEs) to monitoring contexts, according to an embodiment of the present invention.

FIG. 5 is a diagram illustrating architecture for mapping business entities (BEs) to monitoring contexts, according to an embodiment of the present invention. By way of illustration, FIG. 5 depicts a business/enterprise goals component 502, which includes an operational component 504 and a strategic component 506. Additionally, in the process model, BE1 508 can include an information model 510 (which sends content/structural semantics to monitoring context 514) and a life-cycle model 512 (which sends update/change semantics to monitoring context 514). Further, in the monitoring model, the monitoring context for BE1 514 includes metrics 516, inbound events 518, correlations 520, triggers 522, etc. Further, FIG. 5 also depicts an aggregated metrics and KPI component 524, which receives input from the monitoring context 514.

As detailed herein, the key elements of the BE-centric monitoring model can be defined as follows.

1. Monitoring context types are derived directly from BE types; that is, for each BE type, a new monitoring context is defined. Instances of monitoring contexts correspond to instances of BEs; that is, the key K of context mc is defined by an identifier of BE. For example, for a GuestCheck BE type, a monitoring context type $mc_{gc}$ is derived that can access all attributes of the GuestCheck.

2. Metrics: Attributes serve as basic metrics, while aggregated metrics can be derived from basic metrics.

3. KPIs are defined as class-level aggregations of metrics.

4. Event types are derived from the key points in the BE lifecycle. The event types are organized in a simple taxonomy that distinguishes five major event types and, for each type, several subtypes. A business entity can generate the following types of events: (i) entity event type (sub-types being entity Created and DataChange)—denoted $v_c$, (ii) state event type (sub-types Entered and Exited)—denoted $v_{st}$(state, Entered/Exited) (iii) transition event type (sub-types Started and Completed)—denoted $v_{tr}$, (iv) activity event type (sub-types Started, Completed, Enabled)—denoted $v_{act}$, and (v) task event type (sub-types Started, Completed)—denoted $v_{tsk}$.

For event type $v=<dh_{header}, ds_{payload}>$, $ds_{header}$ will contain attributes such as the time stamp, identifier of the event instance, event type, etc. The $ds_{payload}$ is defined as the entire business entity data; that is, $ds_{payload}=ds_e$.

After providing generic specification of monitoring models in the context of the BE paradigm, specific monitoring contexts can be created for particular applications (enterprise processes). A model-driven methodology includes a method for creating monitoring context skeletons based on user inputs. In this method, an enterprise user specifies the targeted KPIs (with the help, for example, of appropriate software tools), and breaks them down hierarchically into metrics that can be mapped or calculated from attributes of business entities or from events.

Input can include the following:

KPI={$kpi_1, kpi_2, \ldots kpi_n$}, a set of key performance indicator names;

E={$e_1, e_2, \ldots e_m$}, a set of business entities of the domain; and $V=\cup_e V_e$, a set of all event types, where $V_e$ is the set of event types generated by business entity e, for e∈E.

Output can include the following:

$M=\cup_{1 \leq i \leq m} M_{e_i}$ where $M_{e_i}$ is a set of metrics that are computed from attributes of $e_i$;

Att={$att_1, att_2, \ldots$}, a set of business entity attributes needed to calculate M;

MC={$mc_1, mc_2, \ldots$}, a set of monitoring contexts with skeleton created; and τ: M→V, a mapping indicating events updating each metric (optional).

Steps for carrying out the method can include the following:

1. For each kpi∈KPI, let the user decompose it into metrics each of which can be represented as an expression using (i) the attributes of some business entity type, and/or (ii) attributes from event headers of event types generated by entity $e_x$, and/or (iii) value of some other metrics:

For each entity type $e_x$∈E:

E*=E*∪{$e_x$}

Let $m_1, m_2, \ldots, m_k$ be the metrics defined for instances of $e_x$ contributing to kpi (that is, are used in the definition of kpi). Then $M_{e_x}=M_{e_x} \cup \{m_1, m_2, \ldots, m_k\}$.

For each $m_i$ in M, let $att_{i1}, att_{i2}, \ldots, att_{ip}\in e_x:ds_e$ be the attributes of $e_x$ used in $m_i$. Then Att=Att ∪ {$att_{i1}, att_{i2}, \ldots, att_{ip}$}.

2. Create an empty monitoring context $mc_e$ for each entity type e∈E*.

3. For each $m_i$ in M, let user identify events $\tau(m_i)=\{v_1, v_2, \ldots v_r\}$ that update $m_i$.

By way of illustration, the method is further described by showing how to create the monitoring context skeleton for sample KPIs in the restaurant example. Consider two KPIs: Average Food Cost Percentage ($kpi_{fcp}$), and Average Revenue per Seat Hour ($kpi_{rsh}$), which are defined for entity type GuestCheck ($e_{gc}$) and KitchenOrder ($e_{ko}$). Also, consider all events of these entity types, that is, $V=e_{gc}.V \cup e_{ko}.V$.

These two KPIs are class-level measures with an average aggregation function based on the GuestCheck entity. In the monitoring context of GuestCheck ($mc_{gc}$), two aggregated metrics are introduced: food cost percentage ($mc_{gc}$.FoodCostPct) and revenue per seat hour ($mc_{gc}$.RevenuePerSeatHour) to define these KPIs:

$kpi_{fcp}$=avg($mc_{gc}$.FoodCostPct)

$kpi_{rsh}$=avg($mc_{gc}$.RevenuePerSeatHour).

As shown in FIG. 1, food cost information is not stored in the information model of GuestCheck. It is retrieved from the correlated KitchenOrder instances, in which the metric Food-Cost sums up the cost stored in each item of the attribute OrderedItems. Therefore:

$$mc_{gc} \cdot FoodCostPct = \left( \sum_{\forall mc_{ko} | mc_{ko}.GChID=mc_{gc}.ID} mc_{ko} \cdot FoodCost \right) \Big/ mc_{gc} \cdot Amount$$

$$mc_{gc} \cdot Amount = e_{gc} \cdot Amount$$

$$mc_{ko} \cdot FoodCost = \sum_{\forall item \in e_{ko}.OrderedItems} (item \cdot FoodCost)$$

Additionally, the user specified that $mc_{gc}$.FoodCostPct will be updated when the GuestCheck enters Completed state (that is, event type $e_{gc}.v_{st}$(Completed, entered) should trigger update). For $mc_{gc}$.Amount event type $e_{gc}.v_{st}$(Completed, entered) shall trigger update, and for $mc_{ko}$.FoodCost event type $e_{ko}.v_{st}$(Delivered, entered) will trigger update. Further, the metric $mc_{gc}$.RevenuePerSeatHour is defined in a similar fashion.

The second part of the methodology is a fully-automated procedure for deriving executable monitoring models from the monitoring context skeletons. The procedure, which follows, takes as inputs the skeletons as defined herein.

Input includes metrics M, monitoring contexts MC, and a mapping τ:M→V. to Output includes MC completely defined. Steps for carrying out the methodology can include the following. For each mc∈MC with corresponding business entity e:

1. Set the monitoring context key to business entity id, that is, mc.K=Oid.

2. Set the metrics as mc.M=$M_e$.

3. Set inbound events using τ if τ is defined; otherwise, inbound events by default are event types generated by e, that is, if τ(mc.M)≠∅ then mc. $V_{in}=\cup_{m \in ms.M} \tau(m)$ else mc.$V_{in}=V_e$ 4. Add $v_{st}(s_{init}$, entered) and $v_{st}(s_{final}$, entered) to mc.$V_{in}$ to make sure mc will get properly initialized and terminated.

5. Set trigger mc.f$_{trigger}$ for every metric in mc.M as follows: ∀ m∈mc.M if τ(m) is defined, m will be updated by events in t(m); otherwise, m will be updated by every v ∈ V$_e$ by using the payload of v (that is, business entity data). In other words:

if τ(m)≠Ø then mc.f$_{trigger}$(m)=τ(m)
else mc.f$_{trigger}$(m)=V$_e$.

6. Set the filter of every inbound event to true, that is, ∀ v∈mc.V$_{in}$, mc.f$_{filter}$(v)=true, since inbound events are limited to those that are generated by business entity e or specified as τ.

7. Set operation mc.f$_{op}$. ∀ v∈mc.V$_{in}$, if v indicates a business entity enters an initial state, a new monitoring context instance is created; if v indicates an entity reaches a final state, the correlated monitoring context instance is terminated. In other words:

if v=v$_{st}$(s$_{init}$, entered) then mc.f$_{op}$(v)=create
else if v=v$_{st}$(s$_{final}$, entered) then mc.f$_{op}$(v)=terminate
else mc.f$_{op}$(v)=null.

8. Set mc.f$_{cr}$ to inbound events with mc, ∀ v∈mc.V$_{in}$, mc.f$_{cr}$(v)=v.d$_{payload}$.id$_e$, that is, v is correlated with mc whose key equals to the business entity id in its payload.

Additionally, one or more embodiments of the invention include execution engine configuration. When Att (that is, business entity attributes needed for calculating targeted KPIs) is defined, a business entity execution engine can be configured in two perspectives to improve the efficiency of performance monitoring.

Event payload: By default, each event carries entire business entity information as its payload. The execution engine can reduce the payload to contain only the attributes in Att. When a business entity contains a huge amount of data (for example, some blob data which typically is not needed for monitoring purpose), this reduction may be necessary to improve event transmission efficiency.

Event emitting: If τ (that is, events that bring update to the monitoring context metrics) is not specified, by default, all events created by a business entity are emitted. The execution engine can reduce the number of emitted events by tracking changes in attribute values. If an event payload contains an attribute with changed value and this attribute is in the list Att, then this event is emitted, otherwise, it is blocked.

Figure 3:
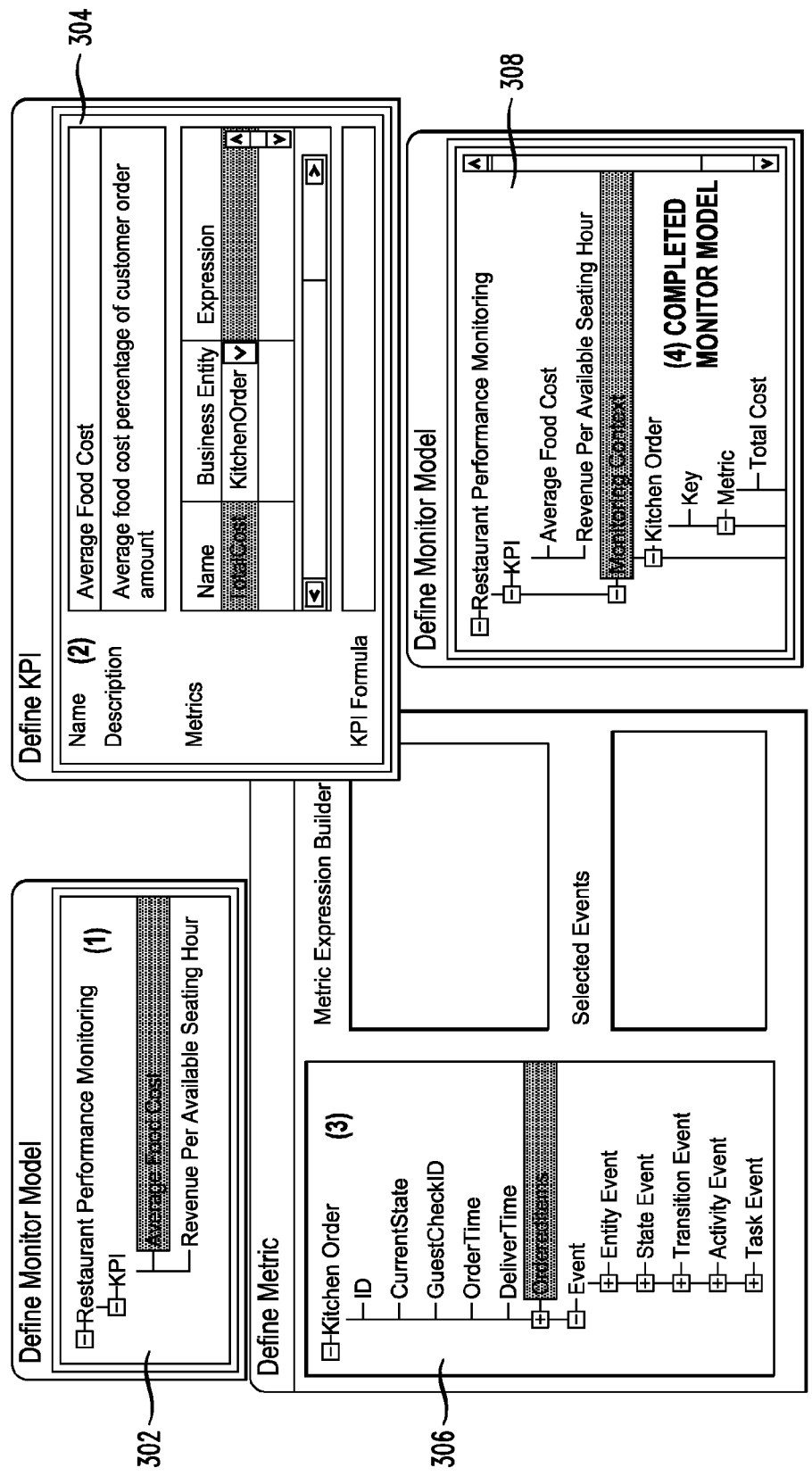
FIG. 3 is a diagram illustrating example performance monitoring user interfaces, according to an embodiment of the invention.

FIG. 3 is a diagram illustrating example performance monitoring user interfaces, according to an embodiment of the invention. By way of illustration, FIG. 3 depicts screen shots that may guide an enterprise user to design KPIs, as described herein. In screen shot 302, the user begins to define a monitoring model with targeted KPIs. The details of a KPI can be defined as shown in screen shot 304. Here, the user can formulate the KPI as a formula of a list of metrics. Each metric can be further defined in screen shot 306, where the metric can be stated as an expression of the attributes of a business entity.

A content assistant can be provided to help define this expression. Moreover, the user can optionally select events that update the attributes and hence refresh the metric. Further, when a KPI is completely defined, corresponding monitoring contexts are automatically generated and appended to the monitoring model, as shown in screen shot 308.

Figure 4:
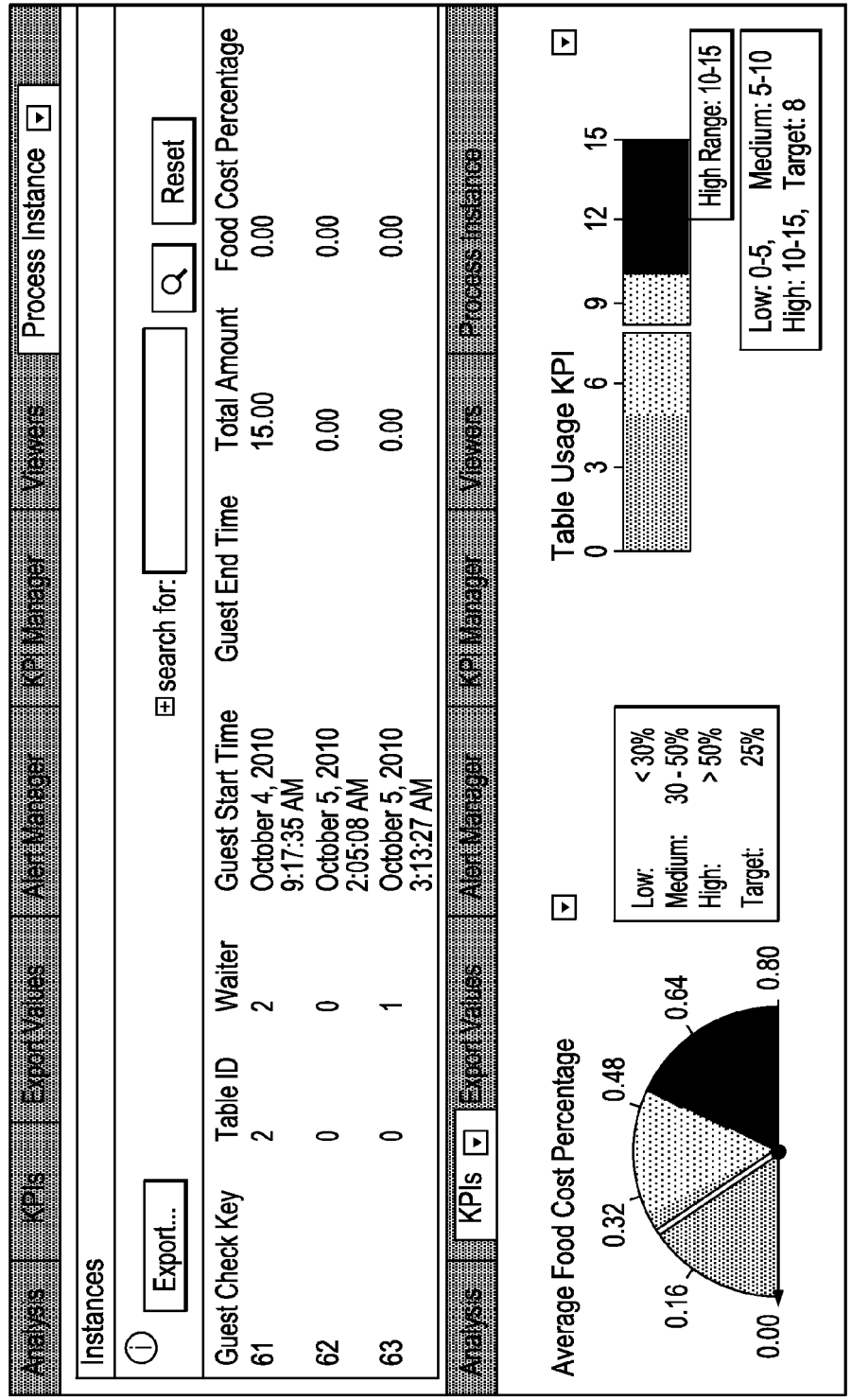
FIG. 4 is a diagram illustrating an example dashboard 402, according to an embodiment of the present invention.

FIG. 4 is a diagram illustrating an example dashboard 402, according to an embodiment of the present invention. By way of illustration, FIG. 4 depicts that KPIs and metrics can displayed in a dashboard, a sample of which is shown in FIG. 4. Metrics are displayed in a process instance view which is created from monitoring contexts. In FIG. 4, each row represents a guest check monitoring context instance. KPIs can be shown graphically, for example, in a bar chart or pie chart in KPI view. Moreover, sophisticated analysis on KPIs, for example, historical data analysis or trend predication, can be shown in analysis view.

One or more embodiments of the invention can also include explicitly modeling monitoring context. In the techniques detailed herein, monitoring contexts enable top-down performance monitoring design and also improve understandability of performance measures and monitoring models. In comparison, Complex Event Processing (CEP) does not specify monitoring contexts explicitly. It is often assumed that context information can be retrieved from somewhere, and hence is not modeled explicitly. However, in a highly distributed environment, such as SOA, this information may be distributed in different applications and not centrally controlled.

As described herein, monitoring contexts are mapped from business entity information, events concerned with state changes of business entities or about activities causing such state changes, and event payload are defined uniformly as business entity information. In contrast, defining monitoring contexts in activity-centric process paradigm involves great complexity and often requires careful manual adjustment. In one or more embodiments of the invention, events are correlated only by business entity identification (ID). Also, in the activity-centric process paradigm, events signal process or activity status changes, but are not directly tied to the data content of the process. As a result, these events may not be easily perceived and utilized by enterprise users in performance monitoring.

Further, business entities with appropriate granularity make corresponding monitoring contexts very flexible and configurable for KPIs from different views. Intuitively, each monitoring context represents an object view related to a business entity, a core enterprise object. Monitoring contexts can be configured and correlated to satisfy needs in the process view. For example, in one of the examples detailed herein, Kitchen Order and Guest Check monitoring contexts are combined to measure performance of the entire catering process. Similarly, resource view can be easily achieved because resources can also be modeled as business entities. In comparison, in the activity-centric approach, it is not straightforward to achieve object view because the lifecycle of an object is fragmented in the isolated contexts for individual activities in a process.

As detailed herein, one or more embodiments of the invention include generating a performance monitor model from business entities. Accordingly, model-driven methodology for creation of real-time performance monitoring solutions, targeted at enterprise users, substantially simplifying design of monitoring models, can include the following steps.

Business entities (modeling the domain of interest) can be used as a natural base for definition of monitoring contexts to effectively integrate relevant information fragments of the domain of interests. A top-down model-driven method can be developed that allows enterprise users and/or domain experts to specify key elements of monitoring models (for example, metrics) in terms of business entities elements. Also, one or more embodiments of the invention include automatically deriving complete, executable monitoring models from specified metrics and underlying business entities. Such models can include a complete definition of monitoring contexts, relevant event types, triggers for detection of events, correlation specifications, as well as a run-time system configuration. Further, one or more embodiments of the invention can include automating event collection and event processing within monitoring contexts.

Figure 6:
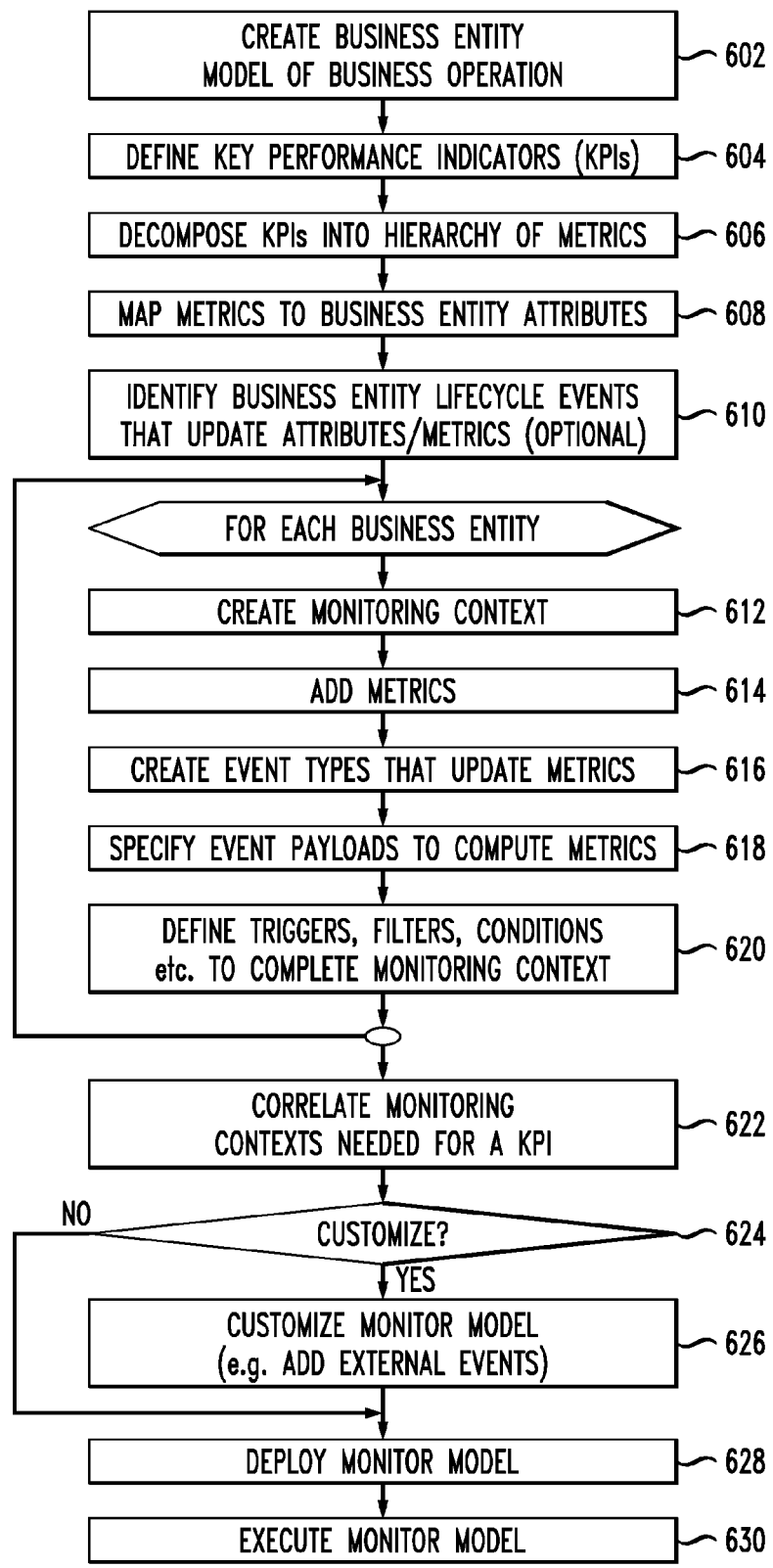
FIG. 6 is a flow diagram illustrating techniques for defining monitoring models, according to an embodiment of the present invention.

FIG. 6 is a flow diagram illustrating techniques for defining monitoring models, according to an embodiment of the present invention. Step 602 includes creating a business entity model of business operation. Step 604 includes defining KPIs. Step 606 includes decomposing KPIs into hierarchy metrics. Step 608 includes mapping metrics to business entity attributes. Step 610 includes identifying business entity lifecycle events that update attributes and/or metrics.

Also, for each business entity, steps 612 through 622 apply. Step 612 includes creating a monitoring context. Step 614 includes adding metrics. Step 616 includes creating event types that update metrics. Step 618 includes specifying event payloads to compute metrics. Step 620 includes defining triggers, filters, conditions, etc. to complete the monitoring context. Step 622 includes correlating monitoring contexts needed for a KPI.

Additionally, step 624 includes determining whether or not to customize. If yes, proceed to step 626, which includes customizing a monitor model (for example, adding external events). If no, proceed to step 628, which includes deploying the monitor model. Step 630 includes executing the monitor model.

By way of illustration in FIG. 6, a model-driven methodology for real-time performance monitoring can include, in one or more embodiments of the invention, two phases. In connection with FIG. 6, Phase 1 includes steps 602, 604, 606, 608 and 610, while Phase 2 (which can be automated) includes steps 612, 614, 616, 618, 620 and 622.

As detailed, Phase 1 includes mapping metrics/KPIs into BE attributes and collecting events updating metrics/KPIs (role: enterprise users). An enterprise user specifies the targeted metrics/KPIs, and with the help of a software tool, breaks them down hierarchically into metrics that can be mapped to or calculated from attributes of business entities (or from events).

Phase 2 includes generating automated executable monitoring models. A fully-automated procedure for deriving executable monitoring models from outputs of phase 1 generates completely defined monitoring contexts, a set of event types that need to be monitored for updating metrics, a required events payload that needs to be communicated between entity execution engine and the monitoring system, and a set of triggers, filters and correlation conditions that make sure events are correlated with the right monitoring contexts and metrics.

Figure 7:
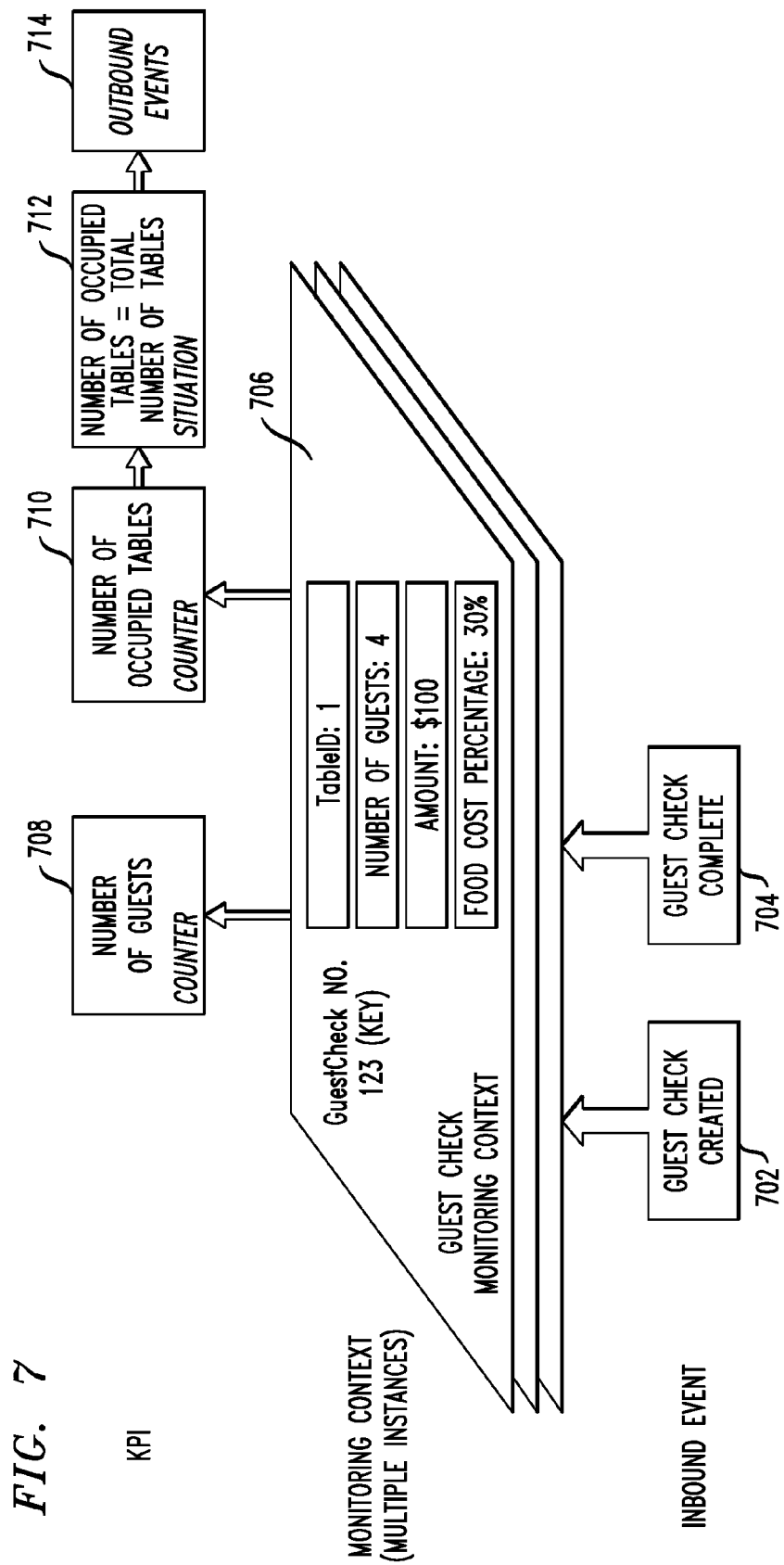
FIG. 7 is a diagram illustrating monitoring context detail, according to an embodiment of the present invention.

FIG. 7 is a diagram illustrating monitoring context detail, according to an embodiment of the present invention. By way of illustration, FIG. 7 depicts inbound events 702 (Guest Check Created) and 704 (Guest Check Complete), which provide input to the guest check monitoring context 706. The monitoring context provides input to KPIs 708 (number of guests counter), 710 (number of occupied tables counter), 712 (total number of tables situation) and 714 (outbound events).

Figure 8:
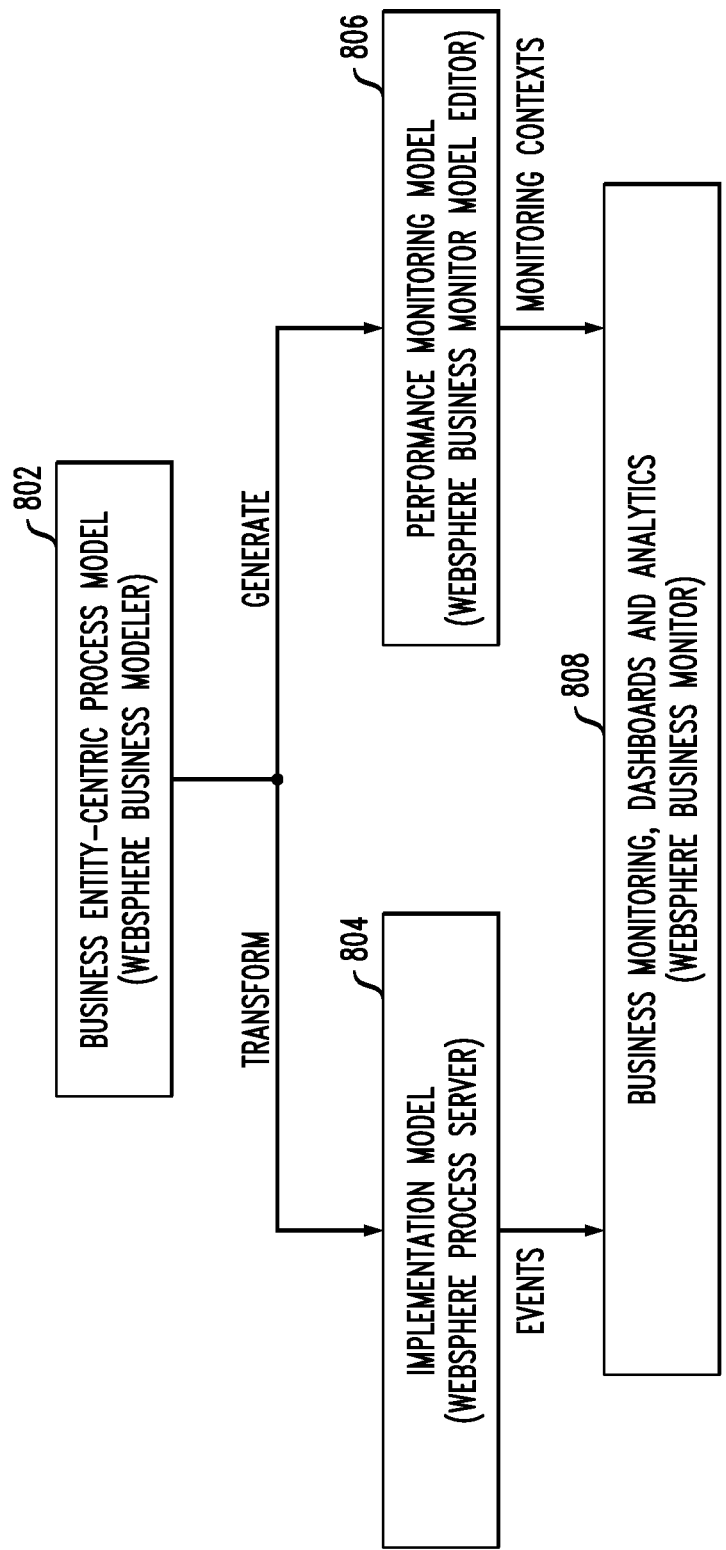
FIG. 8 is a diagram illustrating implementation architecture, according to an embodiment of the present invention.

FIG. 8 is a diagram illustrating implementation architecture, according to an embodiment of the present invention. By way of illustration, FIG. 8 depicts a business entity-centric process model 802, which transforms into an implementation model 804 and generates a performance monitoring model 806. The implementation model 804 provides events data and the performance monitoring model 806 provides monitoring contexts to an enterprise monitoring, dashboards and analytics component 808.

As detailed herein, one or more embodiments of the invention include taking a model-driven approach to automatically or semi-automatically generate an implementation of enterprise monitoring. As illustrated in FIG. 8, an artifact-centric process model, which can be designed using Webspere Business Modeler, is transformed into an implementation model (for example, as BPEL flows or enterprise state machines). The implementation model can be executed, by way of example, using Webpshere Process Server.

During runtime, process and resource events are emitted. Meanwhile, a performance monitoring model including default monitoring contexts is generated from the process model in accord with the Observation meta model specified in Business Operation MetaModel. The default monitoring contexts can be configured, for example, using Webspere Business Monitor Model Editor. Further, the configured monitoring contexts are executed using Webspere Business Monitor to create monitoring context instances when inbound events are received. As a result, the real-time performance of the process can be monitored and dashboards or analytics can be created from these instances.

Figure 9:
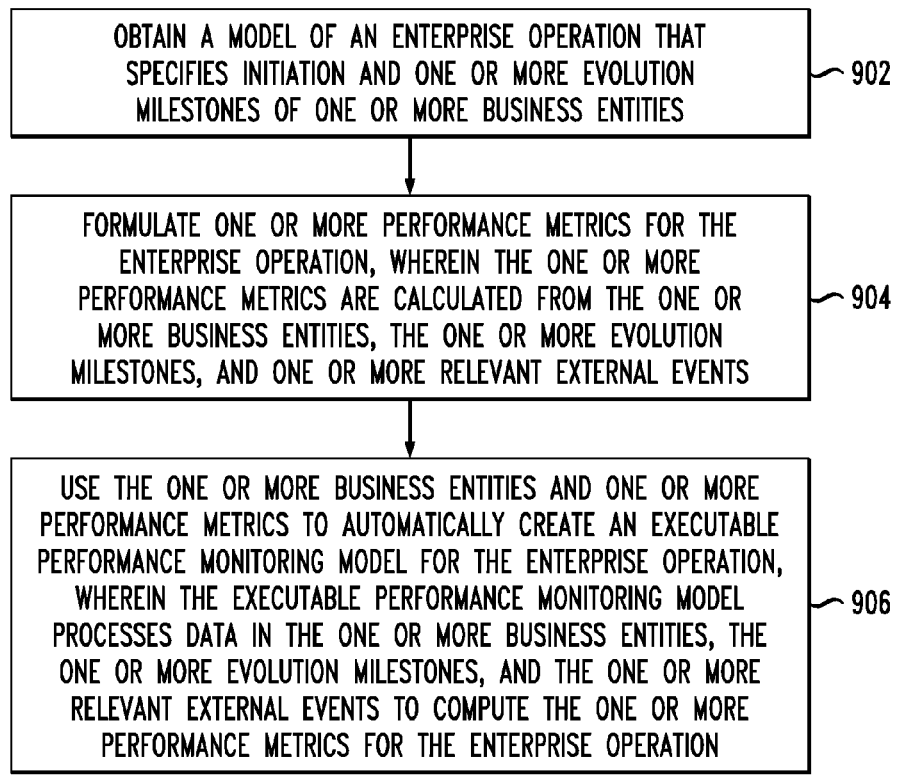
FIG. 9 is a flow diagram illustrating techniques for monitoring enterprise performance, according to an embodiment of the invention.

FIG. 9 is a flow diagram illustrating techniques for monitoring enterprise performance, according to an embodiment of the present invention. Step 902 includes obtaining a model of an enterprise operation that specifies initiation and one or more evolution milestones of one or more business entities. The model can include an existing enterprise operation model, or, in one or more embodiments of the invention, a model can be created.

Step 904 includes formulating one or more performance metrics for the enterprise operation, wherein the one or more performance metrics are calculated from the one or more business entities, the one or more evolution milestones, and one or more relevant external events. The performance metrics can be calculated from the business entities, the evolution milestones and/or external events. Additionally, formulating performance metrics for the enterprise operation can include decomposing one or more KPIs into metrics.

Step 906 includes the one or more business entities and one or more performance metrics to automatically create an executable performance monitoring model for the enterprise operation, wherein the executable performance monitoring model processes data in the one or more business entities, the one or more evolution milestones, and the one or more relevant external events to compute the one or more performance metrics for the enterprise operation.

The techniques depicted in FIG. 9 also include defining monitoring contexts using the performance metrics formulations and the business entities. Further, one or more embodiments of the invention include correlating two or more monitoring contexts if a performance metric is calculated from multiple business entities. Additionally, the techniques depicted in FIG. 9 include executing the performance monitoring model for the enterprise operation with monitoring run-time which receives one or more events issued from business entity instances.

Further, one or more embodiments of the invention include configuring the executable performance monitoring model for the enterprise operation to improve performance monitoring efficiency. Configuring the monitoring model can include emitting only events that change one or more attributes of the business entity from which the performance metrics are formulated, as well as including only attributes from the business entity from which the performance metrics are formulated in an event payload.

The techniques depicted in FIG. 9 can also include mapping the performance metrics to one or more business entity attributes, and identifying one or more business entity lifecycle events that update the performance metrics.

The techniques depicted in FIG. 9 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a data source module, a monitoring context module, and a performance measure/metric module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 10:
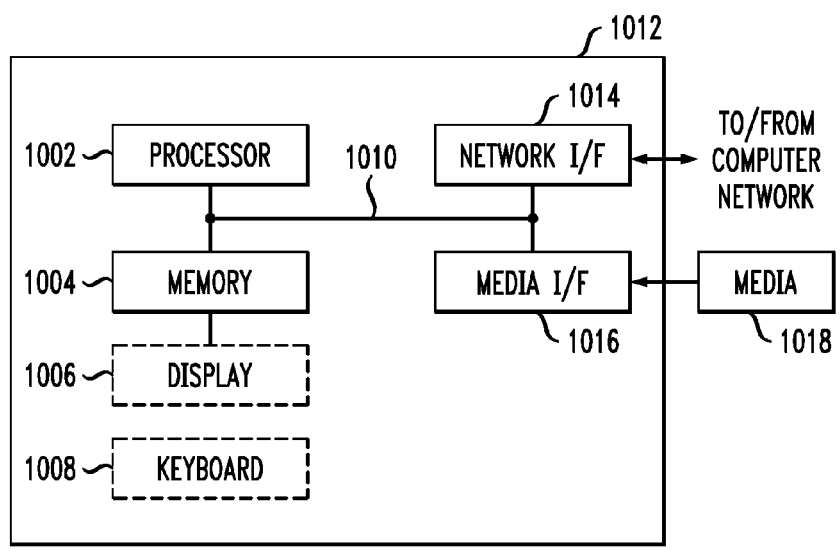
FIG. 10 is a system diagram of an exemplary computer system on which at least one embodiment of the invention can be implemented.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1018 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in the figures and corresponding descriptions herein. The method steps can then be carried out using the distinct software modules and/or sub-modules of the system, as described above, executing on one or more hardware processors 1002. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing an algorithm to derive monitoring contexts based on target KPIs and business entity-centric process models.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for monitoring enterprise performance, wherein the method comprises:
    obtaining a model of an enterprise operation that specifies (i) initiation of the enterprise operation and (ii) multiple lifecycle milestones of one or more business entities of the enterprise operation, wherein each of the one or more business entities comprises a sub-operation of the enterprise operation;
    defining a monitoring context that delineates (a) a set of one or more performance metrics for the enterprise operation, (b) computation details for the one or more performance metrics, and (c) identification of all collected events and a subset of the collected events that update the one or more performance metrics and (d) rules for processing the collected events and the subset of the collected events, wherein the one or more performance metrics are calculated based on (i) the one or more business entities, (ii) the multiple lifecycle milestones, and (iii) the subset of the collected events; and
    mapping the one or more performance metrics to one or more given attributes of the one or more business entities to automatically create a computing device-executable performance monitoring model for the enterprise operation, wherein the executable performance monitoring model processes data in connection with (i) the one or more business entities, (ii) the multiple lifecycle milestones, and (iii) the subset of the collected events to compute the one or more performance metrics in real-time during execution of the enterprise operation;
    wherein at least one of said obtaining, said formulating, and said mapping is carried out by a computing device.

2. The method of claim 1, wherein the model comprises an existing enterprise operation model.

3. The method of claim 1, further comprising creating a model of an enterprise operation.

4. The method of claim 1, further comprising correlating two or more monitoring contexts if a performance metric is calculated from multiple business entities.

5. The method of claim 1, further comprising executing the performance monitoring model for the enterprise operation with monitoring run-time which receives one or more events issued from one or more business entity instances.

6. The method of claim 1, further comprising configuring the executable performance monitoring model for the enterprise operation to improve performance monitoring efficiency, wherein configuring the monitoring model comprises:
    emitting only the subset of the collected events that change one or more attributes of the one or more business entity from which the one or more performance metrics are formulated; and
    including only attributes from the one or more business entities from which the one or more performance metrics are formulated in an event payload.

7. The method of claim 1, wherein formulating one or more performance metrics for the enterprise operation comprises decomposing one or more key performance indicators (KPIs) into one or more metrics.

8. The method of claim 1, further comprising identifying one or more business entity life-cycle events that update the one or more performance metrics.

9. The method of claim 1, further comprising providing a system, wherein the system comprises one or more distinct software modules, each of the one or more distinct software modules being embodied on a tangible computer-readable recordable storage medium, and wherein the one or more distinct software modules comprise a data source module, a monitoring context module, and a performance measure/metric module executing on a hardware processor.

10. A computer program product comprising a non-transitory computer readable recordable storage medium including computer useable program code for monitoring enterprise performance, the computer program product including:
    computer useable program code for obtaining a model of an enterprise operation that specifies (i) initiation of the enterprise operation and (ii) multiple lifecycle milestones of one or more business entities of the enterprise operation, wherein each of the one or more business entities comprises a sub-operation of the enterprise operation;
    computer useable program code for defining a monitoring context that delineates (a) a set of one or more performance metrics for the enterprise operation, (b) computation details for the one or more performance metrics, and (c) identification of all collected events and a subset of the collected events that update the one or more performance metrics and (d) rules for processing the collected events and the subset of the collected events, wherein the one or more performance metrics are calculated based on (i) the one or more business entities, (ii) the multiple lifecycle milestones, and (iii) the subset of the collected events; and
    computer useable program code for mapping the one or more performance metrics to one or more given attributes of the one or more business entities to automatically create a computing device-executable performance monitoring model for the enterprise operation, wherein the executable performance monitoring model processes data in connection with (i) the one or more business entities, (ii) the multiple lifecycle milestones, and (iii) the subset of the collected events to compute the one or more performance metrics in real-time during execution of the enterprise operation.

11. The computer program product of claim 10, further comprising computer useable program code for correlating two or more monitoring contexts if a performance metric is calculated from multiple business entities.

12. The computer program product of claim 10, further comprising computer useable program code for executing the performance monitoring model for the enterprise operation with monitoring run-time which receives one or more events issued from one or more business entity instances.

13. The computer program product of claim 10, further comprising computer useable program code for configuring the executable performance monitoring model for the enterprise operation to improve performance monitoring efficiency, wherein the computer useable program code for configuring the executable performance monitoring model comprises:

computer useable program code for emitting only the subset of the collected events that change one or more attributes of the one or more business entity from which the one or more performance metrics are formulated; and computer useable program code for including only attributes from the one or more business entities from which the one or more performance metrics are formulated in an event payload.

14. The computer program product of claim 10, further comprising computer useable program code for identifying one or more business entity life-cycle events that update the one or more performance metrics.

15. A system for monitoring enterprise performance, comprising:

a memory; and at least one processor coupled to the memory and operative to:

obtain a model of an enterprise operation that specifies (i) initiation of the enterprise operation and (ii) multiple lifecycle milestones of one or more business entities of the enterprise operation, wherein each of the one or more business entities comprises a sub-operation of the enterprise operation;

defining a monitoring context that delineates (a) a set of one or more performance metrics for the enterprise operation, (b) computation details for the one or more performance metrics, and (c) identification of all collected events and a subset of the collected events that update the one or more performance metrics and (d) rules for processing the collected events and the subset of the collected events, wherein the one or more performance metrics are calculated based on (i) the one or more business entities, (ii) the multiple lifecycle milestones, and (iii) the subset of the collected events; and map the one or more performance metrics to one or more given attributes of the one or more business entities to automatically create a computing device-executable performance monitoring model for the enterprise operation, wherein the executable performance monitoring model processes data in connection with (i) the one or more business entities, (ii) the multiple lifecycle milestones, and (iii) the subset of the collected events to compute the one or more performance metrics in real-time during execution of the enterprise operation.

16. The system of claim 15, wherein the at least one processor coupled to the memory is further operative to correlate two or more monitoring contexts if a performance metric is calculated from multiple business entities.

17. The system of claim 15, wherein the at least one processor coupled to the memory is further operative to execute the performance monitoring model for the enterprise operation with monitoring run-time which receives one or more events issued from one or more business entity instances.

18. The system of claim 15, wherein the at least one processor coupled to the memory is further operative to configure the executable performance monitoring model for the enterprise operation to improve performance monitoring efficiency, wherein the at least one processor coupled to the memory operative to configure the monitoring model comprises is further operative to:

emit only events that change one or more attributes of the one or more business entity from which the one or more performance metrics are formulated; and include only attributes from the one or more business entities from which the one or more performance metrics are formulated in an event payload.

19. The system of claim 15, wherein the at least one processor coupled to the memory is further operative to identify one or more business entity life-cycle events that update the one or more performance metrics.

* * * * *